J. B. NAU.
TEMPERING FURNACE ARRANGEMENT.
APPLICATION FILED OCT. 15, 1908.
916,477.
Patented Mar. 30, 1909.
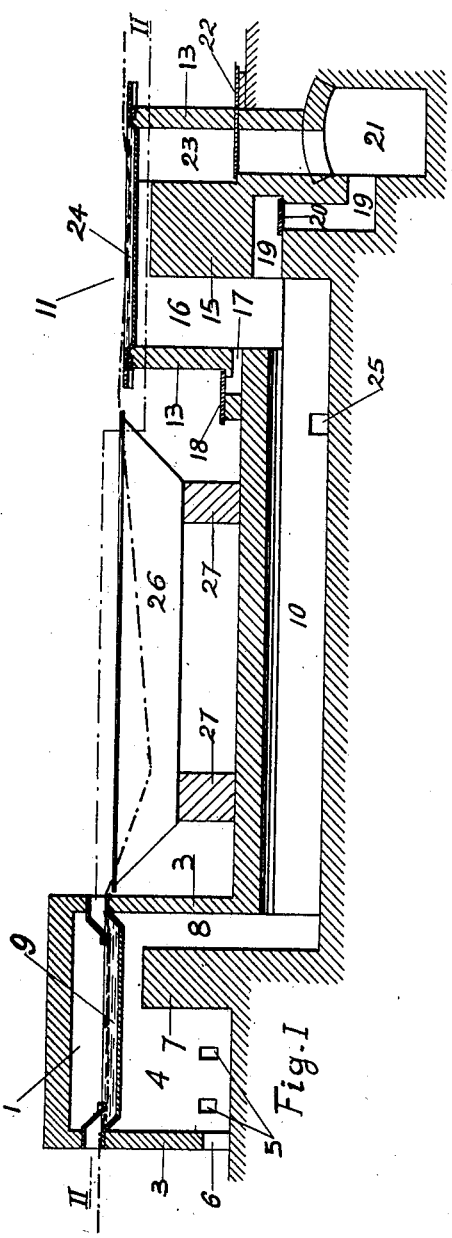
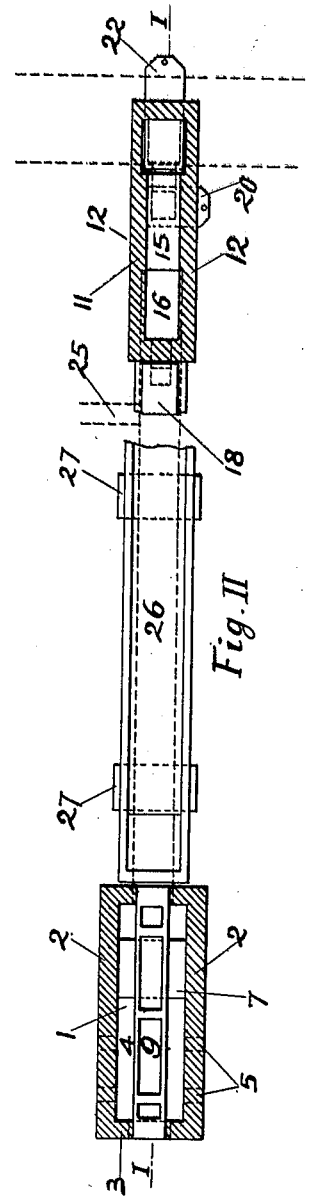
WITNESSES:
INVENTOR
John B. Nau

UNITED STATES PATENT OFFICE.

JOHN B. NAU, OF NEW YORK, N. Y.

TEMPERING-FURNACE ARRANGEMENT.

No. 916,477.

Specification of Letters Patent.

Patented March 30, 1909.

Application filed October 15, 1908. Serial No. 457,869.

*To all whom it may concern:*

Be it known that I, JOHN B. NAU, citizen of the United States, and resident of New York city, in the county of New York and State of New York, have invented certain new and useful Improvements in Tempering-Furnace Arrangements, of which the following is a specification.

My invention relates more particularly to the manner of heating furnaces of the style used in the process of hardening and tempering wire or similar products, in which process the products to be treated are run through a bath of molten lead contained in a pot placed inside a furnace, which latter, for convenience sake, I call hardening furnace, then through a hardening liquid, and then again through a second bath of molten lead contained in a pot that forms practically the top of a tempering furnace.

The invention may also find application in any method or process, where, during the successive operations to which the objects to be treated are submitted, they may have to be run through a series of furnaces that can be heated on the principle hereinafter described. This principle consists in burning fuel, preferably producer gas, in one furnace, carry the products of combustion and the still remaining unconsumed gases to the second furnace, where the waste heat contained in said products of combustion and more especially the further heat that can be obtained by burning the said remaining unconsumed gases with a fresh supply of air, are utilized to heat the said second furnace, before allowing the gases to escape from it. It is obvious that the number of furnaces thus heated on the aforesaid principle need not be limited to two, but a succession of three or more furnaces can be heated by leading the products of combustion successively from for instance the first to the second, from the second to the third, etc., and thus heat each furnace in turn in the manner hereinafter described, before letting the waste gases escape from the last furnace.

The annexed drawings and the following description set forth certain means embodying the invention, such disclosed means constituting but one of various forms in which the principle of the invention may be used.

In said annexed drawings, Figure I is a vertical cross section on line I I of Fig. II.;
Fig. II. is a plan view on line II II of Fig. I.

Referring to these drawings:—1 represents the hardening furnace with side walls 2, end walls 3, combustion chamber 4, gas inlet ports 5 located in the side walls, air inlet opening 6, bridge wall 7 and return flue 8; 9 is a melting pot made of cast iron or any other suitable material, resting with its ends on the end walls and placed inside the furnace, where during the operation it is surrounded with flame. Any other support may be supplied to uphold this pot in any point of its length.

10 is a flue connecting furnace 1 with furnace 11. Furnace 11 has side walls 12, end walls 13, bridge wall 15, combustion chamber 16, air inlet openings 17 regulated by damper 18, damper 20 controlling a by-pass flue 19 that leads to smoke flue 21, another damper 22 controlling waste gas flue 23, through which the spent gases reach smoke flue 21.

A lead melting pot 24 forms the roof of the furnace.

25 is the opening of a flue through which gas can be admitted to flue 10 should it be found necessary to admit more gas to furnace 11.

Resting on piers 27 between the two furnaces is placed a tank 26 containing oil or any other hardening liquid.

The wire to be treated is run from left to right in the way shown by the heavy broken line indicated in Fig. I in the direction from hardening furnace to tempering furnace.

The operation of heating will be done as follows: The gas admitted through the gas ports into the hardening furnace will be burned in said furnace, the flame surrounding the lead pot will melt and heat the lead, the products of combustion with the still unconsumed gases will be evacuated through flue 8, will pass through flue 10 and enter the tempering furnace. Here a suitable supply of air will be admitted to burn the still unconsumed gases contained in the mixture coming from the hardening furnace, after which the gases after having passed under pot 24, will be evacuated from said tempering furnace and enter smoke flue 21. Should it be desirable to prevent the gases from passing all under pot 24, damper 20 may be pulled open partly or entirely and much gas will enter directly smoke flue 21 through by-pass 19. This by-pass may be omitted. When leaving furnace 11, the gases instead of entering the smoke flue, may be further taken through a flue similar to flue 10 to a third furnace, said third furnace being again heated in the manner described to heat furnace 11 of the drawings.

For simplicity's sake I have not shown a third furnace, as it was deemed that the principle employed was sufficiently illustrated in its application to the two furnaces shown on the drawings.

In the application of the heating principle heretofore described, I do not limit myself to introducing the air into the tempering furnace at or near the point 17 shown on the drawings. It may be found more convenient to introduce this air at any suitable location in flue 10, whereby the unburned gas coming from the hardening furnace would start burning before reaching the combustion chamber 16 of said tempering furnace. This would in no way alter the principle employed but at times it might help to obtain a lower temperature under pot 24 should a somewhat lower temperature be necessary. In flue 10 I may also use checkerwork for the purpose of storing away some of the heat coming from the hardening furnace. As such checkerwork is well known to those acquainted with furnace practice, I have not deemed it necessary to show it on the drawing, thus avoiding complication.

I claim as my invention and wish to secure by Letters Patent:

1. The method of jointly heating a hardening furnace and a tempering furnace, which method consists in burning fuel in said hardening furnace, leading the mixture of the products of combustion and remaining combustibles from said hardening furnace to said tempering furnace, heating said tempering furnace by means of the heat derived from said products of combustion and from the combustion of said remaining combustibles.

2. The method of jointly heating by gas a hardening furnace and a tempering furnace, which method consists in burning gas in said hardening furnace, leading the mixture of the products of combustion and remaining unburned gases from said hardening furnace to said tempering furnace, heating said tempering furnace by means of the heat derived from said products of combustion and from the combustion of said remaining unburned gases.

3. The method of jointly heating a hardening furnace and a tempering furnace, which method consists in burning a combustible in one of said furnaces, leading the mixture of products of combustion and remaining unconsumed combustible from the said one furnace to the other one of said furnaces and heat this said other furnace by means of the heat derived from said products of combustion and from the combustion of said unconsumed combustibles.

4. In combination, a hardening furnace, a tempering furnace, a flue connecting said hardening furnace with said tempering furnace for the purpose of carrying the products of combustion and the remaining combustibles from one of said furnaces to the other one of said furnaces.

5. In combination, a hardening furnace having gas inlet device and air inlet device, a tempering furnace with air inlet device, a flue leading from said hardening furnace to said tempering furnace, and a waste gas flue leading from said tempering furnace.

Signed at New York city in the county of New York and State of New York this fourteenth day of October A. D. 1908.

JOHN B. NAU.

Witnesses:
DAVID GRANT,
JOHN BUCKRIDGE.